United States Patent
Ando et al.

(10) Patent No.: US 10,333,373 B2
(45) Date of Patent: Jun. 25, 2019

(54) METHOD OF MANUFACTURING A STATOR OPERATIVELY ASSOCIATED WITH INNER AND OUTER CIRCUMFERENTIAL JIGS

(71) Applicant: TOYOTA JIDOSHA KABUSHIKI KAISHA, Toyota-shi, Aichi-ken (JP)

(72) Inventors: Fujio Ando, Nagoya (JP); Hirotsugu Iwamoto, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 214 days.

(21) Appl. No.: 15/384,555

(22) Filed: Dec. 20, 2016

(65) Prior Publication Data

US 2017/0104397 A1    Apr. 13, 2017

Related U.S. Application Data

(62) Division of application No. 14/009,670, filed as application No. PCT/JP2011/058630 on Apr. 5, 2011, now abandoned.

(51) Int. Cl.
*H02K 3/12* (2006.01)
*H02K 3/28* (2006.01)
(Continued)

(52) U.S. Cl.
CPC ........... *H02K 15/0087* (2013.01); *F01D 9/00* (2013.01); *H02K 3/12* (2013.01); *H02K 3/28* (2013.01); *Y10T 29/49316* (2015.01)

(58) Field of Classification Search
CPC ........ H02K 15/0087; H02K 3/12; H02K 3/28; Y10T 29/49316
See application file for complete search history.

(56) References Cited

U.S. PATENT DOCUMENTS 5,787,567 A * 8/1998 Miyazaki ................. H02K 3/12
                                                                29/596
5,926,940 A * 7/1999 Toh ....................... H02K 15/045
                                                                29/596

(Continued)

FOREIGN PATENT DOCUMENTS

JP    2003-284300 A    10/2003
JP    2004-282947 A    10/2004

(Continued)

*Primary Examiner* — Minh N Trinh
(74) *Attorney, Agent, or Firm* — Hunton Andrews Kurth LLP

(57) ABSTRACT

A method for manufacturing a stator operatively associated with an inner and outer circumferential jigs including sequentially ordered steps of inserting segment coils, each constituting of a pair of straight portions connected with a connecting portion in a U-like shape, in slots of a stator core, rotating a twisting ring while distal end parts of the pairs of straight portions protruding on an opposite side to the connecting portions are engaged with ring grooves of the twisting ring to twist and shape in one direction the distal end parts located in odd-numbered positions from an outer circumferential side or an inner circumferential side in a radial direction and twist and shape the distal end parts located in even-numbered positions in an opposite direction to the one direction, and welding the distal end parts twisted in the one direction and the distal end parts twisted in the opposite direction.

4 Claims, 14 Drawing Sheets

(51) Int. Cl.
  *H02K 15/00*   (2006.01)
  *F01D 9/00*    (2006.01)

(56) References Cited

U.S. PATENT DOCUMENTS

| | | | |
|---|---|---|---|
| 6,441,527 B1 | 8/2002 | Taji | |
| 9,806,577 B2 * | 10/2017 | Kaneshige | H02K 3/50 |
| 2003/0222528 A1 | 12/2003 | Dobashi et al. | |
| 2009/0200888 A1 | 8/2009 | Tanaka et al. | |
| 2011/0198953 A1 | 8/2011 | Shinohara | |
| 2012/0007460 A1 * | 1/2012 | Kitamura | H02K 3/12 |
| | | | 310/195 |
| 2014/0030078 A1 * | 1/2014 | Ando | F01D 9/00 |
| | | | 415/185 |
| 2017/0104397 A1 * | 4/2017 | Ando | F01D 9/00 |

FOREIGN PATENT DOCUMENTS

| | | |
|---|---|---|
| JP | 2007-037344 A | 2/2007 |
| JP | 2009-219343 A | 9/2009 |
| WO | 2011/102150 A1 | 8/2011 |
| WO | 2011/102210 A1 | 8/2011 |

\* cited by examiner

METHOD OF MANUFACTURING A STATOR OPERATIVELY ASSOCIATED WITH INNER AND OUTER CIRCUMFERENTIAL JIGS

CROSS-REFERENCE TO RELATED APPLICATIONS

This is a divisional of U.S. patent application Ser. No. 14/009,670, filed on Oct. 3, 2013, which is a national phase application based on the PCT International Patent Application No. PCT/JP2011/058630 filed on Apr. 5, 2011, the entire contents of which are incorporated herein by reference.

TECHNICAL FIELD

The present invention relates to a stator in which segment coils each consisting of a pair of straight portions connected with a connecting portion in a U-like shape are set in slots of a stator core, each pair of the straight portions having distal end parts protruding on an opposite side to the connecting portion, and each distal end part is twisted in a circumferential direction and joined to a straight portion of another segment coil, and a method for manufacturing the stator.

BACKGROUND ART

Patent Document 1 discloses a stator in which segment coils each consisting of a pair of straight portions connected with a connecting portion in a U-like shape are set in slots of a stator core, each pair of the straight portions having distal end parts protruding on an opposite side to the connecting portion, and each distal end part is twisted in a circumferential direction and joined to a straight portion of another segment coil twisted in a circumferential direction, and a method for manufacturing the stator.

For instance, when ten in-slot wire portions are mounted, distal end parts of odd-numbered in-slot wire portions from the inner circumference are twisted clockwise and distal end parts of even-numbered in-slot wire portions are twisted counterclockwise. This twist-shaping is performed for the distal end parts of the in-slot wire portions over the whole circumference. Thus, regarding one segment coil of a U phase, between its $1^{st}$ and $3^{rd}$ clockwise-twisted distal end parts from the inner circumference, a $2^{nd}$ distal end part of an adjacent segment coil of the U phase from the inner circumference, twisted counterclockwise, is placed.

Specifically, the $1^{st}$ distal end part of the U-phase one segment coil, the $2^{nd}$ distal end part of the U-phase adjacent segment coil, and the $3^{rd}$ distal end part of the U-phase one segment coil are arranged closely in a radial direction. The $1^{st}$ distal end part of the U-phase one segment coil and the $2^{nd}$ distal end part of the U-phase adjacent segment coil are joined to each other through their end faces by TIG welding. This state is illustrated as a partial plan view of a stator in FIG. 19.

RELATED ART DOCUMENTS

Patent Documents

Patent Document 1: JP-A-2004-282947

SUMMARY OF INVENTION

Problems to be Solved by the Invention

However, the technique of Patent Document 1 has the following problems. As shown in FIG. 19, when the end faces of a $1^{st}$ distal end part 101 of one segment coil and a $2^{nd}$ distal end part 102 of an adjacent segment coil are joined by TIG welding, a bead 103 may protrude out of the wire end faces. In case the bead 103 protrudes out of the end faces of the distal end parts, the bead 103 may contact with a $3^{rd}$ distal end part 104 of the U-phase one segment coil.

To avoid such a possibility, it is necessary to precisely control the size of the beads 103. For this purpose, additional and accurate control is necessary for TIG welding. This increases costs for manufacturing facility and hence product costs.

The present invention has been made in view of the circumstances to solve the above problems and has a purpose to provide a stator and a method for manufacturing the stator, whereby gaps or clearance in a circumferential direction and a radial direction is ensured to prevent beads from contacting with adjacent distal end parts even if large beads are formed when the distal end parts are joined by TIG welding.

Means of Solving the Problems (1) To achieve the above purpose, one aspect of the invention provides a stator in which a plurality of segment coils each consisting of a pair of straight portions connected with a connecting portion in a U-like shape are set in slots of a stator core, each of the pairs of straight portions having distal end parts protruding on an opposite side to the connecting portions, the distal end parts located in odd-numbered positions from an outer or inner circumferential side in a radial direction are twisted in one direction and the distal end parts located in even-numbered positions are twisted in an opposite direction to the one direction, and the distal end parts twisted in the one direction and the distal end parts twisted in the opposite direction are joined to each other by welding, wherein the distal end parts twisted in the one direction are shaped toward an outer circumference in the radial direction and the distal end parts twisted in the opposite direction are shaped toward an inner circumference in the radial direction, so that at least part of the distal end parts twisted in the one direction and the distal end parts twisted in the opposite direction are welded to each other on the same circumference, and the distal end part of a first one of the coils, located on an outermost circumference, and the distal end part of a second one of the coils, located second from the outermost circumference, are located between a first position corresponding to an in-slot position of the first coil and a second position corresponding to an in-slot position of the second coil in the radial direction, and the distal end part of a third one of the coils, located third from the outermost circumference, and the distal end part of a fourth one of the coils, located fourth from the outermost circumference, are located between a third position corresponding to an in-slot position of the third coil and a fourth position corresponding to an in-slot position of the fourth coil in the radial direction.

(2) In the stator described in (1), preferably, the distal end parts twisted in the one direction are shaped toward the outer circumference in the radial direction by a length corresponding to half a thickness of the straight portion in the radial direction, and the distal end parts twisted in the opposite direction are shaped toward the inner circumference in the radial direction by a length corresponding to half the thickness of the straight portion in the radial direction, and the distal end part of the first coil located on the outermost circumference and the distal end part of the second coil located second from the outermost circumference are located at a halfway position in the radial direction between the first position corresponding to the in-slot position of the first coil and the second position corresponding to the in-slot position of the second coil, and the distal end part of the third coil located third from the outermost circumference and the distal end part of the fourth coil located fourth from the outermost circumference are located at a halfway position in the radial direction between the third position corresponding to the in-slot position of the third coil and the fourth position corresponding to the in-slot position of the fourth coil.

(3) In the stator described in (1) or (2), preferably, the distal end part twisted in the one direction and the distal end part twisted in the opposite direction are located so that their end faces facing at the same position in a circumferential direction are placed in contact with each other.

(4) Another aspect of the invention provides a method for manufacturing a stator, the method including: an inserting step of inserting segment coils, each constituting of a pair of straight portions connected with a connecting portion in a U-like shape, in slots of a stator core; a twisting step of rotating a twisting ring while distal end parts of the pairs of straight portions protruding on an opposite side to the connecting portions are engaged with ring grooves of the twisting ring to twist and shape in one direction the distal end parts located in odd-numbered positions from an outer circumferential side or an inner circumferential side in a radial direction and twist and shape the distal end parts located in even-numbered positions in an opposite direction to the one direction; and a welding step of welding the distal end parts twisted in the one direction and the distal end parts twisted in the opposite direction, wherein the twisting step includes twisting and shaping the distal end parts twisted in the one direction and the distal end parts twisted in the opposite direction so that the distal end parts are placed in adjacent positions in a circumferential direction, the method further includes a radial-direction shaping step, after the twisting step, of shaping the distal end parts twisted in the one direction toward an outer circumference in the radial direction and shaping the distal end parts twisted in the opposite direction toward an inner circumference in the radial direction, and the radial-direction shaping step includes plastically deforming the distal end part of a first one of the coils, located on an outermost circumference, and the distal end part of a third one of the coils, located third from the outermost circumference, toward the inner circumference in the radial direction by use of an inner circumferential direction jig, and plastically deforming the distal end part of a second one of the coils, located second from the outermost circumference, and the distal end part of a fourth one of the coils, located fourth from the outermost circumference, toward the outer circumference in the radial direction by use of an outer circumferential direction jig.

(5) In the stator manufacturing method described in (4), preferably, the radial-direction shaping step includes: shaping the distal end parts twisted in the one direction toward the outer circumference in the radial direction by a length corresponding to half a thickness of the straight portion in the radial direction; and shaping the distal end parts twisted in the opposite direction toward the inner circumference in the radial direction by a length corresponding to half a thickness of the straight portion in the radial direction, and wherein after the radial-direction shaping step, the distal end part of the first coil located on an outermost circumference and the distal end part of the second coil located second from the outermost circumference are located, in the radial direction, at a halfway position between a first position corresponding to an in-slot position of the first coil and a second position corresponding to an in-slot position of the second coil, and after the radial-direction shaping step, the distal end part of the third coil located third from the outermost circumference and the distal end part of the fourth coil located fourth from the outermost circumference are located, in the radial direction, at a halfway position between a third position corresponding to an in-slot position of the third coil and a fourth position corresponding to an in-slot position of the fourth coil.

(6) In the stator manufacturing method described in (4) or (5), preferably, the distal end part twisted in the one direction and the distal end part twisted in the opposite direction are located so that their end faces facing at the same position in a circumferential direction are placed in contact with each other.

Effects of the Invention

The stator and the stator manufacturing method according to the present invention provides the following operations and effects. Conventional distal end parts are arranged with large gaps in the circumferential direction but with little gaps in the radial direction. In contrast, with the above configuration (1), the gaps in the circumferential direction are reduced and the gaps in the radial direction are generated. It is therefore possible to generate appropriate gaps or clearance all around the pair of distal end parts to be welded. Even if large beads are formed, accordingly, the beads are less likely to contact with the adjacent distal end parts. Consequently, there is no need to precisely control the size of the beads, thus leading to cost reduction of a control unit.

With the above configuration (2), it is possible to form almost uniform gaps all around each pair of distal end parts to be welded. Even if large beads are formed, accordingly, the beads are less likely to contact with the adjacent distal end parts. Consequently, there is no need to precisely control the size of the beads, thus leading to cost reduction of the control unit.

Conventional distal end parts are arranged with large gaps in the circumferential direction but with little gaps in the radial direction. In contrast, with the above configuration (4), the gaps in the circumferential direction are reduced and the gaps in the radial direction are generated. It is therefore possible to generate appropriate gaps or clearance all around the pair of distal end parts to be welded. Even if large beads are formed, accordingly, the beads are less likely to contact with the adjacent distal end parts. Consequently, there is no need to precisely control the size of the beads, thus leading to cost reduction of a control unit.

With the above configuration (5), it is possible to form almost uniform gaps all around each pair of distal end parts to be welded. Even if large beads are formed, accordingly, the beads are less likely to contact with the adjacent distal end parts. Consequently, there is no need to precisely control the size of the beads, thus leading to cost reduction of the control unit.

MODE FOR CARRYING OUT THE INVENTION

Figure 1:
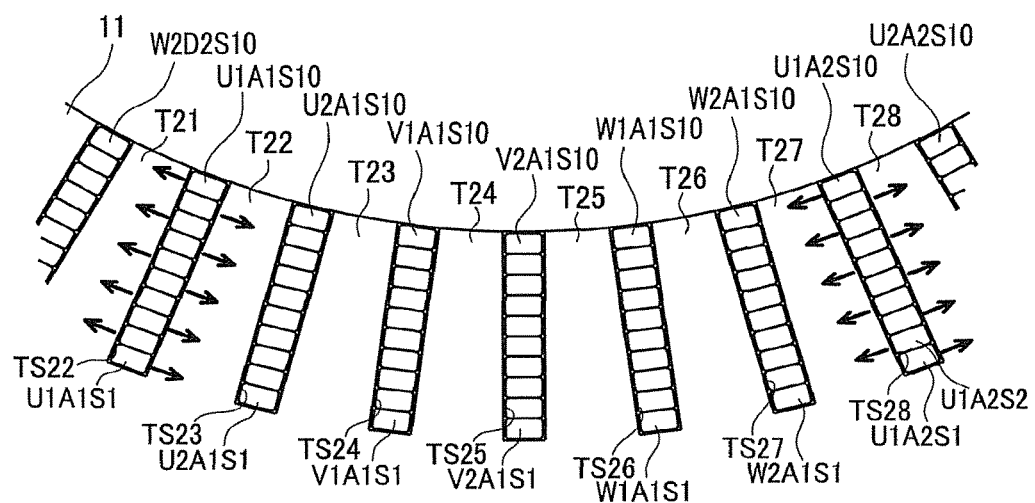
FIG. 1 is a partial plan view of a stator.
Figure 2:
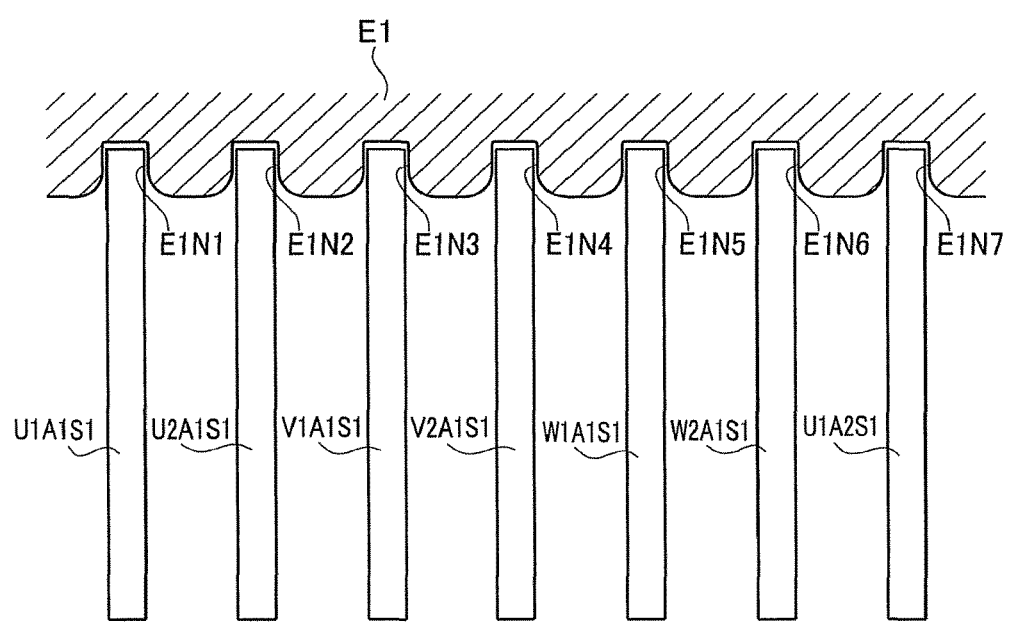
FIG. 2 is a side view of FIG. 1.
Figure 3:
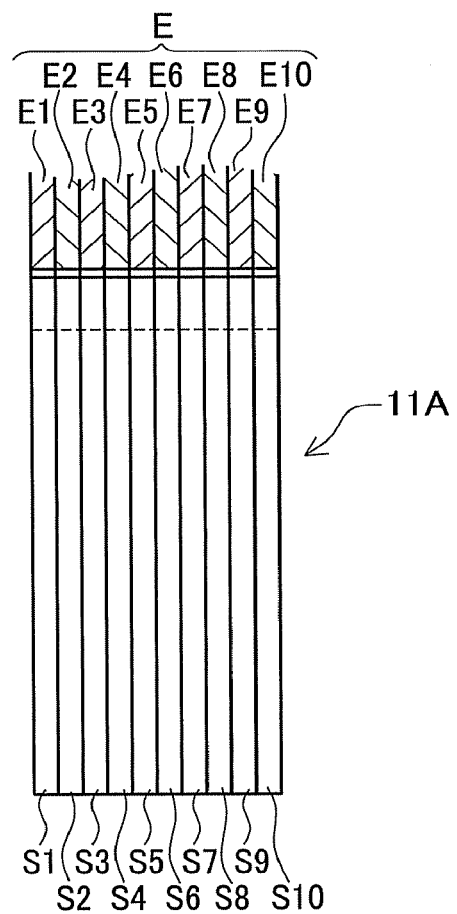
FIG. 3 is a side view of in-slot wire portions in one part in FIG. 2.

A detailed description of a preferred embodiment of a method for manufacturing a stator according to the present invention will now be given referring to the accompanying drawings. FIG. 1 is a partial plan view of a stator core 11 in which ten in-slot wire portions S1 to S10 are set in each slot. In FIG. 1, a twisting ring E is not illustrated. FIG. 2 is a side view of FIG. 1. In FIG. 2, for easy viewing, the slots of FIG. 1 are illustrated in planar form and at equal intervals. FIG. 3 is a side view of the in-slot wire portions S in one part in FIG. 2.

Figure 16A:
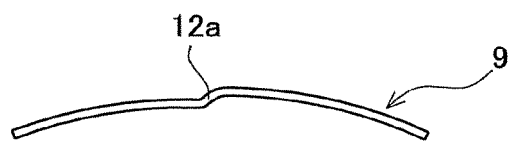
FIG. 16A is a plan view of a segment coil.
Figure 16B:
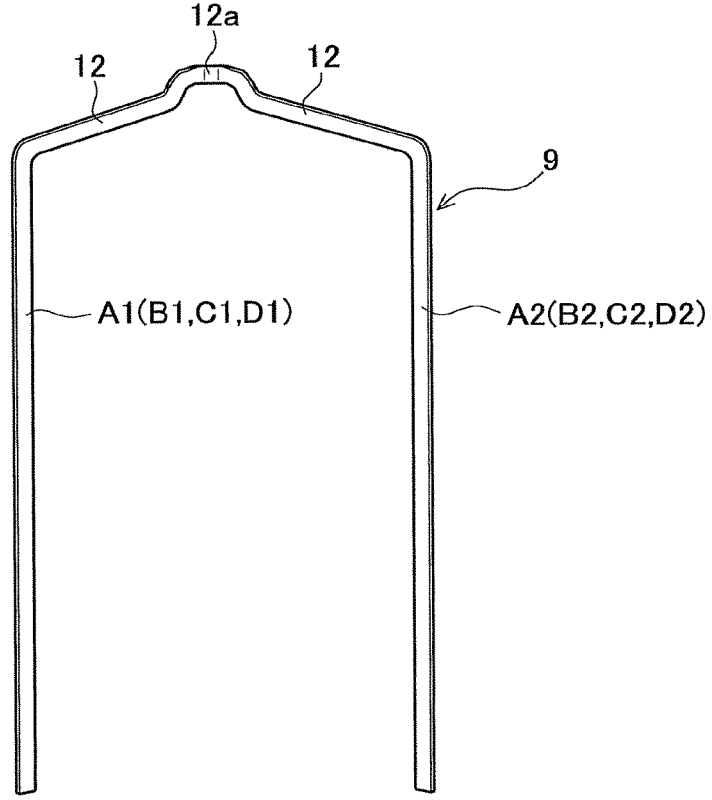
FIG. 16B is a front view of the segment coil.

The stator core 11 of the present embodiment includes forty-eight slots TS1 to TS48, in each of which ten in-slot wire portions S1 to S10 are arranged. One example of a segment coil 9 used in the present embodiment is shown in FIGS. 16A and 16B. FIG. 16B is a front view of the segment coil 9 and FIG. 16A is a plan view of FIG. 16B. The segment coil 9 is formed from a conductive wire made of copper, having a flat rectangular cross section, about 1.8 mm long and about 3.3 mm wide, and a coated surface. The segment coil 9 includes two straight portions A1 and A2 and a connecting portion 12 connecting the straight portions A1 and A2. At the center of the connecting portion 12, a stepped portion 12a is formed for lane change. The shape of the segment coil 9 shown in FIG. 16A is one example. The present embodiment uses ten kinds of segment coils 9 having slightly different shapes.

As shown in FIG. 1, in a slot TS22 between a teeth part T21 and a teeth part T22, ten portions U1A1S1 to U1A1S10 forming one-side straight portions A1 of a first segment group A of a U-phase first coil U1 are stacked in layers from the outer circumferential side to the inner circumferential side. In a slot TS23 between the teeth part T22 and a teeth part T23, ten portions U2A1S1 to U2A1S10 forming one-side straight portions A1 of a first segment group A of a U-phase second coil U2 are stacked in layers from the outer circumferential side to the inner circumferential side.

In a slot TS24 between the teeth part T23 and a teeth part T24, ten portions V1A1S1 to V1A1S10 forming one-side straight portions A1 of a first segment group A of a V-phase first coil V1 are stacked in layers from the outer circumferential side to the inner circumferential side. In a slot TS25 between the teeth part T24 and a teeth part T25, ten portions V2A1S1 to V2A1S10 forming one-side straight portions A1 of a first segment group A of a V-phase second coil V2 are stacked in layers from the outer circumferential side to the inner circumferential side.

In a slot TS26 between the teeth part T25 to a teeth part T26, ten portions W1A1S1 to W1A1S10 forming one-side straight portions A1 of a first segment group A of a W-phase first coil W1 are stacked in layers from the outer circumferential side to the inner circumferential side. In a slot TS27 between the teeth part T26 and a teeth part T27, ten portions W2A1S1 to W2A1S10 forming one-side straight portions A1 of a first segment group A of a W-phase second coil W2 are stacked in layers from the outer circumferential side to the inner circumferential side.

In a slot TS28 between the teeth part T27 and a teeth part T28, ten portions U1A2S1 to U1A2S10 forming other-side straight portions A2 of the first segment coil group A of the U-phase first coil U1 are stacked in layers from the outer circumferential side to the inner circumferential side. Each of the U-phase first coil U1, U-phase second coil U2, V-phase first coil V1, V-phase second coil V2, W-phase first coil W1, and Z-phase second coil W2 is formed of ten segment coils 9.

Each of the six coils, i.e., U-phase first coil U1, U-phase second coil U2, V-phase first coil V1, V-phase second coil V2, W-phase first coil W1, and W-phase second coil W2, includes four segment coil groups. In forty-eight slots, segment coil groups U1A, U1B, U1C, and U1D are inserted as the U-phase first coil U1 in eight slots TS22 (U1A1), TS28 (U1A2), TS34 (U1B1), TS40 (U1B2), TS46 (U1C1), TS4 (U1C2), TS10 (U1D1), and TS16 (U1D2). Further, segment coil groups U2A, U2B, U2C, and U2D are inserted as the U-phase second coil in eight slots TS23 (U2A1), TS29 (U2A2), TS35 (U2B1), TS41 (U2B2), TS47 (U2C1), TS5 (U2C2), TS11 (U2D1), and TS17 (U2D2).

Similarly, segment coil groups V1A, V1B, V1C, and V1D are inserted as the V-phase first coil V1 in eight slots TS24 (V1A1), TS30 (V1A2), TS36 (V1B1), TS42 (V1B2), TS48 (V1C1), TS6 (V1C2), TS12 (V1D1), and TS18 (V1D2). Further, segment coil groups V2A, V2B, V2C, and V2D are inserted as the V-phase second coil in eight slots TS25 (V2A1), TS31 (V2A2), TS37 (V2B1), TS43 (V2B2), TS1 (V2C1), TS7 (V2C2), TS13 (V2D1), and TS19 (V2D2).

Similarly, segment coil groups W1A, W1B, W1C, and W1D are inserted as the W-phase first coil W1 in eight slots TS26 (W1A1), TS32 (W1A2), TS38 (W1B1), TS44 (W1B2), TS2 (W1C1), TS8 (W1C2), TS14 (W1D1), and TS20 (W1D2). Further, segment coil groups W2A, W2B, W2C, and W2D are inserted as the W-phase second coil in eight slots TS27 (W2A1), TS33 (W2A2), TS39 (W2B1), TS45 (W2B2), TS3 (W2C1), TS9 (W2C2), TS15 (W2D1), and TS21 (W2D2). Since each segment coil group includes ten pairs of straight portions, i.e., a total of 20 straight portions, the total of the six coils is four times thereof, i.e., 480 straight portions, so that ten straight portions are arranged in each of forty-eight slots TS1 to TS48.

To form a U-phase distributed winding coil, it is necessary to internally connect each of the segment coil groups U1A, U1B, U1C, and U1D of the U-phase first coil and also sequentially connect the four segment coil groups U1A, U1B, U1C, and U1D of the U-phase first coil U1 to each other. Similarly, it is necessary to sequentially connect the segment groups U2A, U2B, U2C, and U2D of the U-phase second coil to each other.

Furthermore, the U-phase first coil U1D and the U-phase second coil U2A have to be connected to each other. To form a V-phase distributed winding coil, similarly, it is necessary to connect the V-phase first coil V1D to the V-phase second coil V2A. To form a W-phase distributed winding coil, similarly, it is necessary to connect the W-phase first coil W1D to the W-phase second coil W2A in a similar manner to the U phase.

As one concrete example, the in-slot wire portion U1A1S1 of the one-side straight portion U1A1 of the U-phase first coil has to be connected to the in-slot wire portion U1A2S2 of the other-side straight portion U1A2. For this purpose, it is necessary to twist and shape the distal end part of the in-slot wire portion U1A1S1 protruding from a stator core, counterclockwise as indicated by an arrow in FIG. 1, and twist and shape clockwise the distal end part of the in-slot wire portion U1A2S2 protruding from the stator core to bring both distal end parts close to each other and join them by welding. This twisting step or process will be explained below.

As shown in FIG. 2, the distal end parts of the in-slot wire portions U1A1S1, U2A1S1, V1A1S1, V2A1S1, W1A1S1, W2A1S1, and U1A2S1 are engaged with ring grooves E1N1 to E1N7 of a twisting ring E. This twisting ring E includes ten twisting rings E to E10 having different diameters, arranged concentrically, as shown in FIG. 3. The twisting ring E1 is located on an outermost circumference and the twisting ring E10 is located on an innermost circumference.

Each of the twisting rings E1 to E10 is formed with forty-eight ring grooves N1 to N48. As shown in FIG. 2, the distal end part of the in-slot wire portion U1A1S1 is engaged with the ring groove E1N1 of the twisting ring E1, the distal end part of the in-slot wire portion U2A1S1 is engaged with the ring groove E1N2 of the twisting ring E1, the distal end part of the in-slot wire portion V1A1S1 is engaged with the ring groove E1N3 of the twisting ring E1, the distal end part of the in-slot wire portion V2A1S1 is engaged with the ring groove E1N4 of the twisting ring E, the distal end part of the in-slot wire portion W1A1S1 is engaged with the ring groove E1N5 of the twisting ring E1, the distal end part of the in-slot wire portion W2A1S1 is engaged with the ring groove E1N6 of the twisting ring E1, and the distal end part of the in-slot wire portion U1A2S1 is engaged with the ring groove E1N7 of the twisting ring E1.

Furthermore, as shown in FIG. 3, regarding the straight portions, or ten in-slot wire portions U1A1S1 to U1A1S10, of a one-side straight section 11A of the first segment group A of the U-phase first coil U1, the straight portion U1A1S1 is engaged with the ring groove E1N of the twisting ring E1, the straight portion U1A1S2 is engaged with the ring groove E2N of the twisting ring E2, the straight portion U1A1S3 is engaged with the ring groove E3N of the twisting ring E3, the straight portion U1A1S4 is engaged with the ring groove E4N of the twisting ring E4, the straight portion U1A1S5 is engaged with the ring groove E5N of the twisting ring E5, the straight portion U1A1S6 is engaged with the ring groove E6N of the twisting ring E6, the straight portion U1A1S7 is engaged with the ring groove E7N of the twisting ring E7, the straight portion U1A1S8 is engaged with the ring groove E8N of the twisting ring E8, the straight portion U1A1S9 is engaged with the ring groove E9N of the twisting ring E9, and the straight portion U1A1S10 is engaged with the ring groove E10N of the twisting ring E10.

The twisting rings E1, E3, E5, E7, and E9 are rotated counterclockwise in FIG. 1 while respective ring grooves E1N, E3N, E5N, E7N, and E9N engage with the distal end parts M of the in-slot wire portions S1, S3, S5, S7, and S9, thereby counterclockwise twisting and shaping the distal end parts M, protruding to the outside of the stator core, of the in-slot wire portions S.

To the contrary, the twisting rings E2, E4, E6, E8, and E10 are rotated clockwise in FIG. 1 while respective ring grooves E2N, E4N, E6N, E8N, and E10N engage with the distal end parts M of the in-slot wire portions S2, S4, S6, S8, and S19, thereby clockwise twisting and shaping the distal end parts M of the in-slot wire portions S protruding out of the stator core. In the twisting step, even though it is not illustrated, a cuff support is inserted on an upper surface of the teeth part T of the stator core, and the in-slot wire portion S is deformed into contact with the upper end face of the cuff support.

Figure 4:
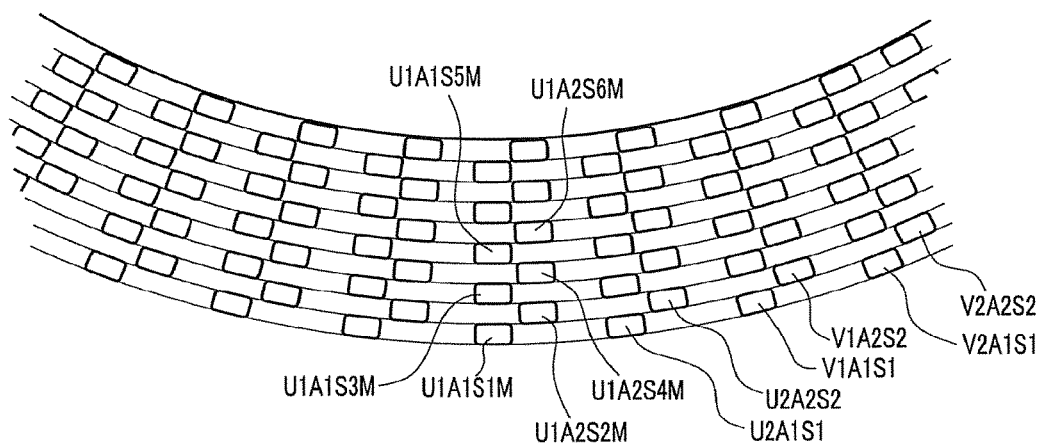
FIG. 4 is a partial plan view of the stator after twisting.
Figure 5:
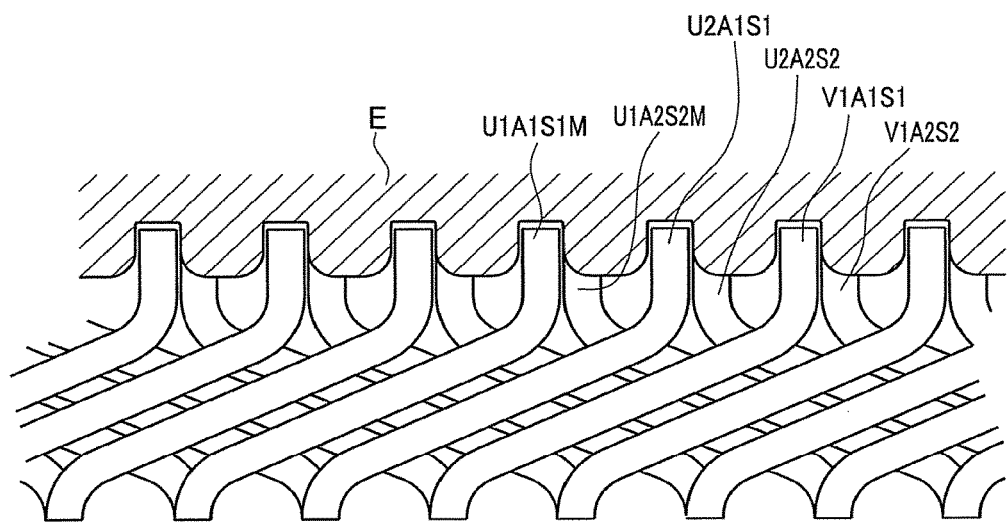
FIG. 5 is a side view of FIG. 4.
Figure 6:
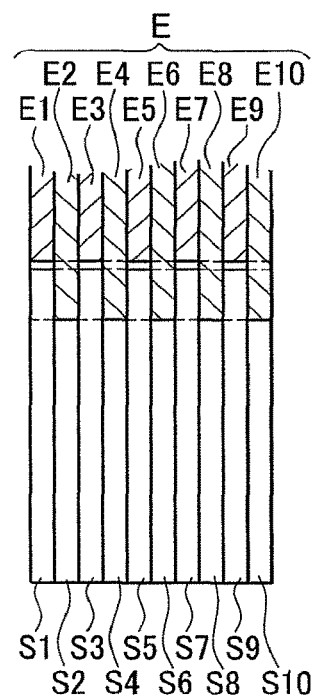
FIG. 6 is a side view of the in-slot wire portions in one part in FIG. 4.

A state of the in-slot wire portions S having been twist-shaped is shown in FIGS. 4 to 6. FIG. 4 corresponds to FIG. 1, FIG. 5 corresponds to FIG. 2, and FIG. 6 corresponds to FIG. 3. In FIG. 5, for easy viewing, the slots of FIG. 4 are illustrated in planar form and at equal intervals. As shown in FIGS. 4 and 5, the distal end part U1A1S1M of the in-slot wire portion U1A1S1 located on the outermost circumference of the one-side straight portions U1A1 of the first segment coil group A of the U-phase first coil U1 is twisted counterclockwise, while the distal end part U1A2S2M of the in-slot wire portion U1A2S2 located second from the outer circumference of the other-side straight portions U1A2 is twisted clockwise. A counterclockwise-side end face of the distal end part U1A1S1M and a clockwise-side end face of the distal end part U1A2S2M are located on an approximately same line in the circumferential direction. In other words, those end faces are twist-shaped to positions with a slight gap in the circumferential direction.

Similarly, the distal end part U1A1S3M of the in-slot wire portion U1A1S3 located third from the outer circumference of the one-side straight portions U1A1 of the first segment coil group A of the U-phase first coil U1 is twisted counterclockwise, while the distal end part U1A2S4M of the in-slot wire portion U1A2S4 located fourth from the outer circumference of the other-side straight portions U1A2 is twisted clockwise. A counterclockwise-side end face of the distal end part U1A1S3M and the clockwise-side end face of the distal end part U1A2S4M are located on the approximately same line in the circumferential direction.

Similarly, the distal end part U1A1S5M of the in-slot wire portion U1A1S5 located fifth from the outer circumference of the one-side straight portions U1A1 of the first segment coil group A of the U-phase first coil U1 is twisted counterclockwise, while the distal end part U1A2S6M of the in-slot wire portion U1A2S6 located sixth from the outer circumference of the other-side straight portions U1A2 is twisted clockwise. A counterclockwise-side end face of the distal end part U1A1S5M and a clockwise-side end face of the distal end part U1A2S6M are located on an approximately same line in the circumferential direction. The same as above applies to remaining distal end parts and their explanation is omitted.

Next, an explanation is given to a radial-direction shaping step to shape five distal end parts U1A1S1M, U1A1S3M, U1A1S5M, U1A1S7M, and U1A1S9M twisted counterclockwise of the one-side straight portions of the first segment coil group A of the U-phase first coil U1 inward in the radial direction and shape five distal end parts U1A2S2M, U1A2S4M, U1A2D6M, U1A2S8M, and U1A2S10M twisted clockwise of the other-side straight portions outward in the radial direction.

Figure 7:
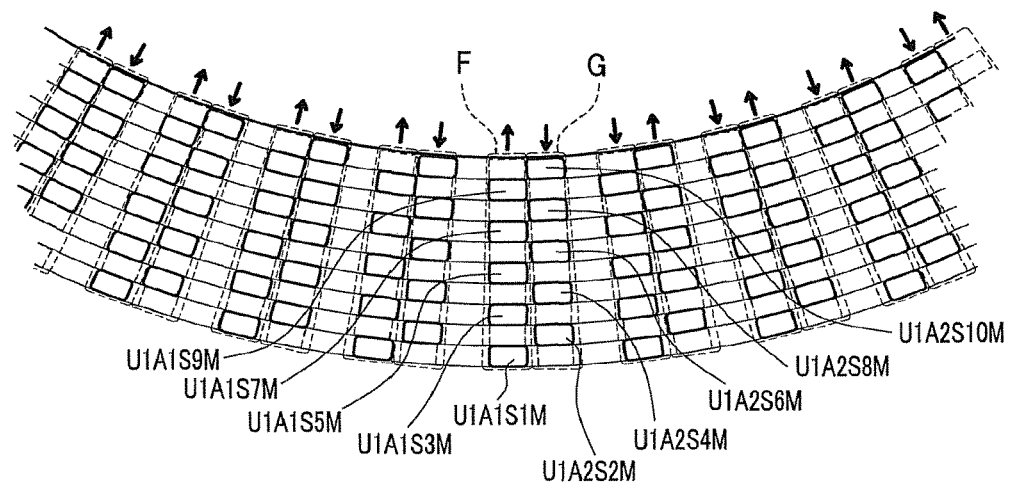
FIG. 7 is a partial plan view of the stator to explain a radial-direction shaping step.
Figure 8:
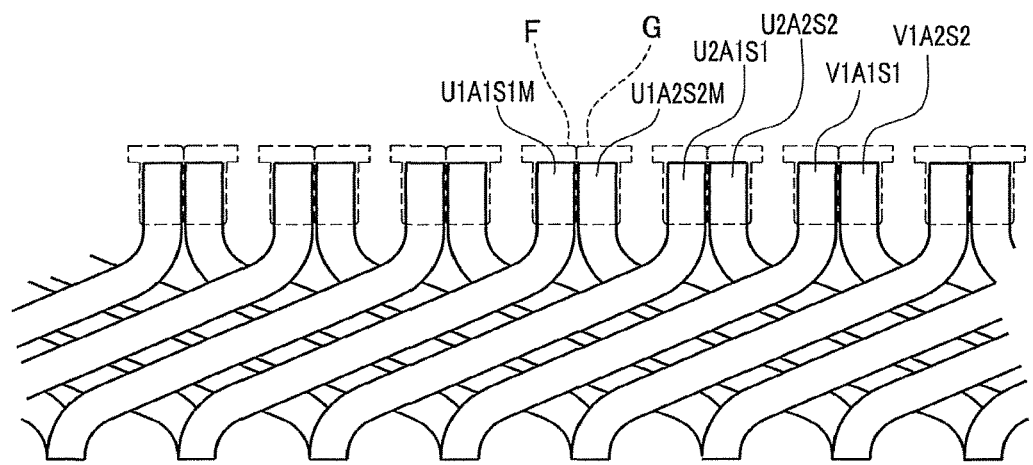
FIG. 8 is a side view of FIG. 7.
Figure 9:
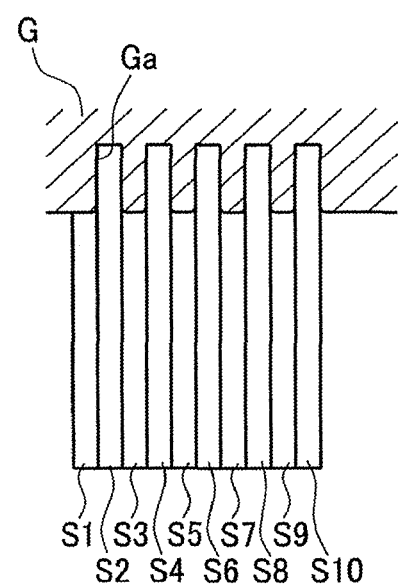
FIG. 9 is a side view of in-slot wire portions in one part in FIG. 7.
Figure 17:
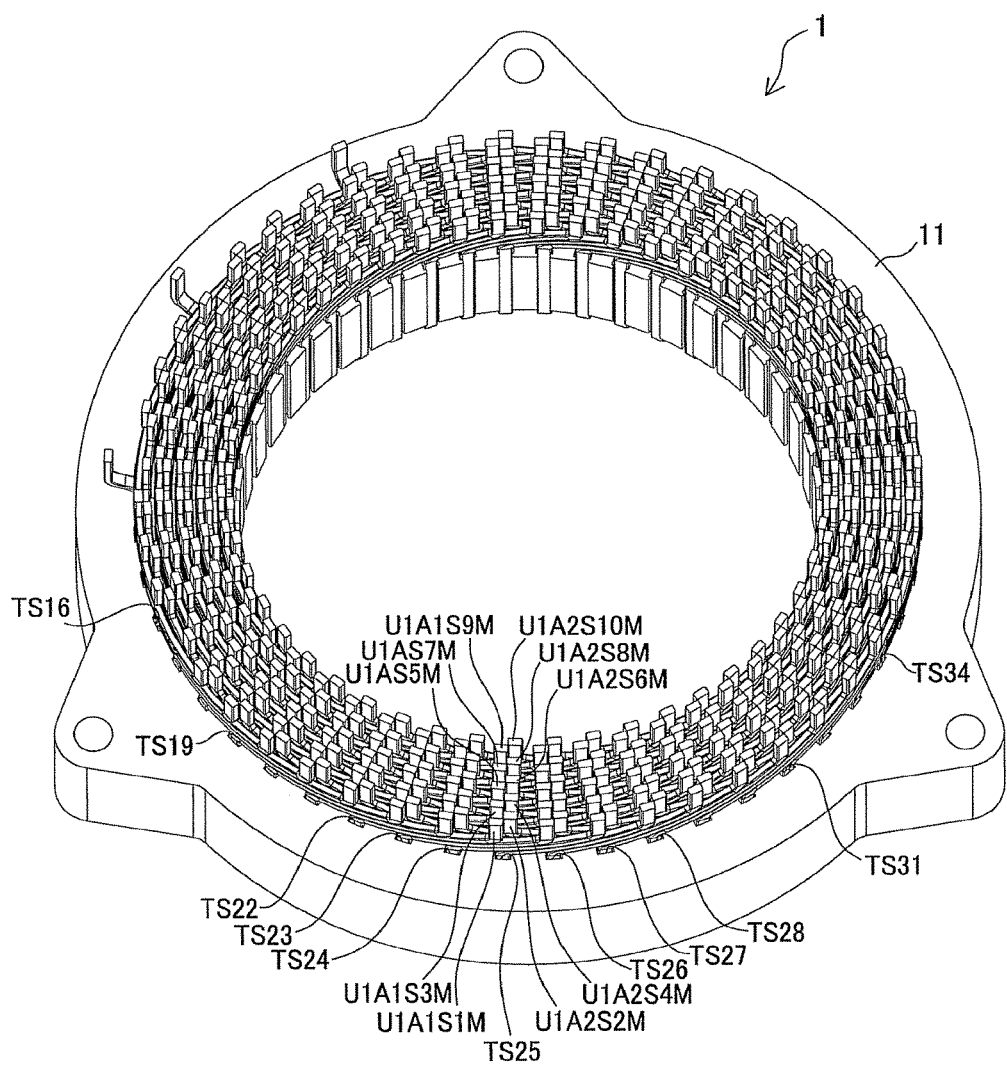
FIG. 17 is a perspective view of a whole stator in a state of FIG. 7.

FIGS. 7 to 9 illustrate the radial-direction shaping step. FIG. 7 corresponds to FIG. 1, FIG. 8 corresponds to FIG. 2, and FIG. 9 corresponds to FIG. 3. In FIG. 7, an inner circumferential direction jig F and an outer circumferential direction jig G are illustrated by dotted lines. In FIG. 8, for easy viewing, the slots of FIG. 7 are illustrated in planar form and at equal intervals. FIG. 17 shows a whole perspective view of a stator 1 in the state of FIG. 7.

As shown in FIGS. 8 and 9, five engagement grooves Fa provided in the inner circumferential direction jig F are engaged with five distal end parts U1A1S1M, U1A1S3M, U1A1S5M, U1A1S7M, and U1A1S9M. Five engagement grooves Ga provided in the outer circumferential direction jig G are engaged with five distal end parts U1A2S2M, U1A2S4M, U1A2S6M, U1A2S8M, and U1A2S10M.

As shown in FIG. 7, the inner circumferential direction jig F is moved inward in the radial direction to plastically deform the five distal end parts U1A1S1M, U1A1S3M, U1A1S5M, U1A1S7M, and U1A1S9M inward in the radial direction. A moving amount of the inner circumferential direction jig F is determined in advance in consideration of spring back of the distal end parts M. Thus, the five distal end parts U1A1S1M, U1A1S3M, U1A1S5M, U1A1S7M, and U1A1S9M are plastically deformed toward the inner circumference precisely by a length or distance corresponding to half the thickness of a wire (1.5 mm/2=0.75 mm).

As shown in FIG. 7, the outer circumferential direction jig G is moved outward in the radial direction to plastically deform the five distal end parts U1A2S2M, U1A2S4M, U1A2S6M, U1A2S8M, and U1A2S10M outward in the radial direction. A moving amount of the outer circumferential direction jig G is determined in advance in consideration of spring back of the distal end parts M. Thus, the five distal end parts U1A2S2M, U1A2S4M, U1A2S6M, U1A2S8M, and U1A2S10M are plastically deformed toward the outer circumference precisely by a length or distance corresponding to half the thickness of a wire (1.5 mm/2=0.75 mm).

The inner circumferential direction jig F and the outer circumferential direction jig G are separately moved by half the thickness of a wire so that the distal end parts in respective moved positions generate averaged gaps with respect to the nearby distal end parts M over the whole circumference. When gaps are uniformly formed over the whole circumference, beads J generated by welding are less likely to contact with the surrounding distal end parts M.

Figure 10:
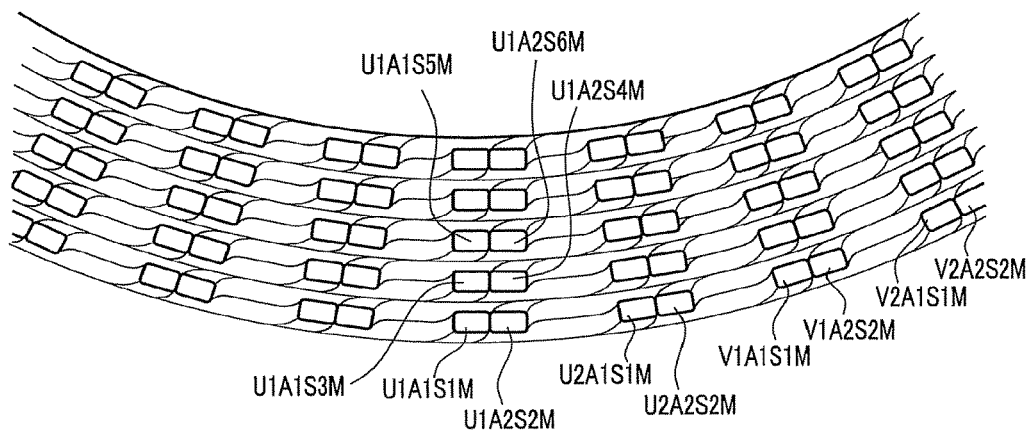
FIG. 10 is a partial plan view of the stator in a state after the radial-direction shaping step.
Figure 11:
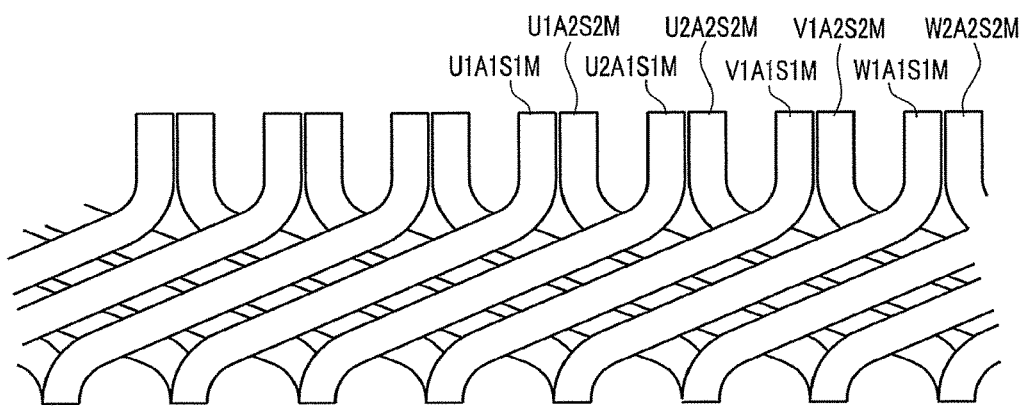
FIG. 11 is a side view of FIG. 10.
Figure 12:
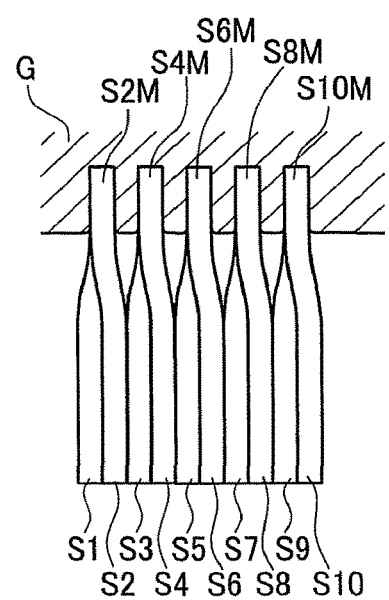
FIG. 12 is a side view of in-slot wire portions in one part in FIG. 10.
Figure 18:
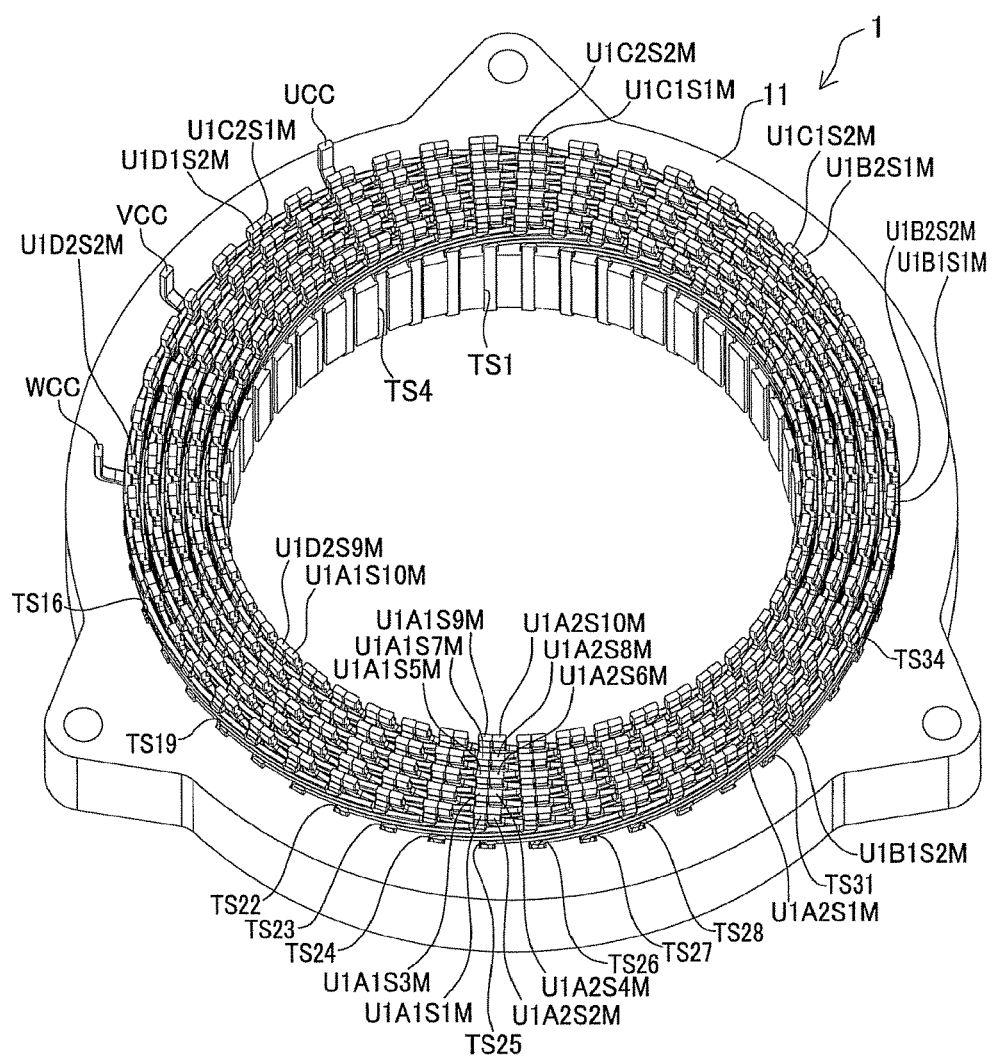
FIG. 18 is a perspective view of a whole stator in a state of FIG. 10.
Figure 19:
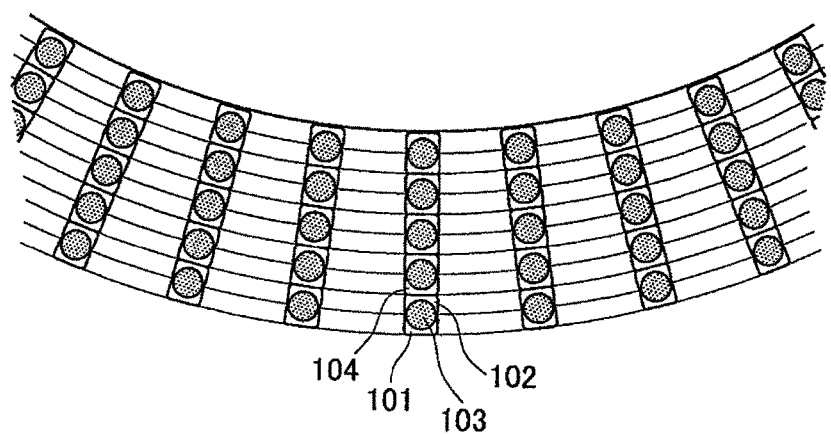
FIG. 19 is a partial plan view of a conventional stator in a state where contact distal end parts are joined to each other by TIG welding.

A state in which the radial-direction shaping step is finished is shown in FIGS. 10 to 12. FIG. 10 corresponds to FIG. 1, FIG. 11 corresponds to FIG. 2, and FIG. 12 corresponds to FIG. 3. In FIG. 11, for easy viewing, the slots of FIG. 10 are illustrated in planar form and at equal intervals. FIG. 18 is a perspective view of the entire stator 1 in the state of FIG. 10.

As shown in FIG. 10, the inward shaped distal end part U1A1S1M and the outward shaped distal end part U1A2S2M are located so that their end faces facing at the same position in the circumferential direction are placed in substantially contact with each other. Similarly, the inward shaped distal end part U1A1S3M and the outward shaped distal end part U1A2S4M are located so that their end faces facing at the same position in the circumferential direction are placed in substantially contact with each other. Similarly, the inward shaped distal end part U1A1S5M and the outward shaped distal end part U1A2S6M are located so that their end faces facing at the same position in the circumferential direction are placed in substantially contact with each other. Similarly, the inward shaped distal end part U1A1S7M and the outward shaped distal end part U1A2S8M are located so that their end faces facing at the same position in the circumferential direction are placed in substantially contact with each other. Similarly, the inward shaped distal end part U1A1S9M and the outward shaped distal end part U1A2S10M are located so that their end faces facing at the same position in the circumferential direction are placed substantially contact with each other.

In this state, for example, the distal end part U1A1S3M and the distal end part U1A2S4M are located in nearly contact with each other, but sufficiently spaced apart from the surrounding distal end parts M to ensure insulation over the entire circumference.

To form the U-phase distributed winding coil as shown in FIG. 18, four segment coil groups U1A, U1B, U1C, and U1D are sequentially connected, returning to the segment coil group U1A, of the U-phase first coil U1. Further, four segment coil groups U2A, U2B, U2C, and U2D are sequentially connected, returning to the segment coil group U2A, of the U-phase second coil U2. The V-phase first coil V1, V-phase second coil V2, W-phase first coil W1, and W-phase second coil V2 are connected in a similar manner to the U phase.

Figure 13:
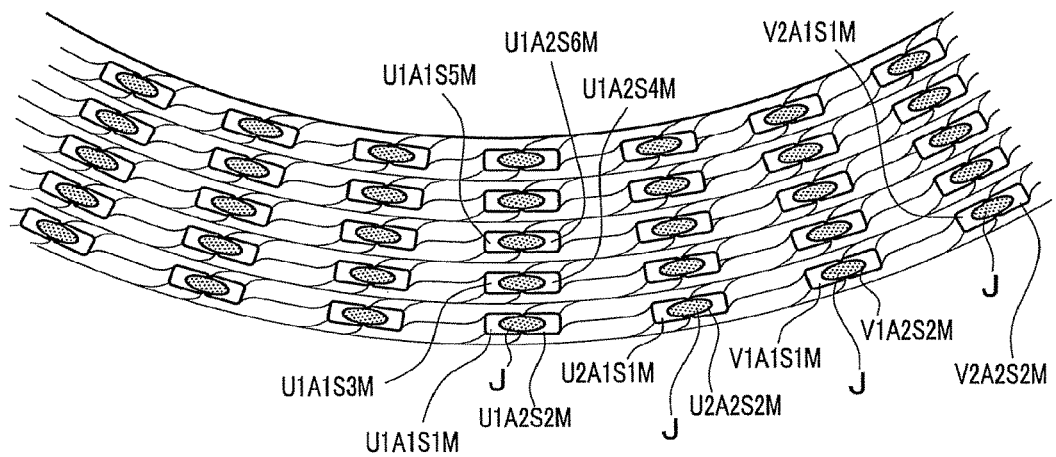
FIG. 13 is a partial plan view of the stator in a state where contact distal end parts are joined to each other by TIG welding.
Figure 14:
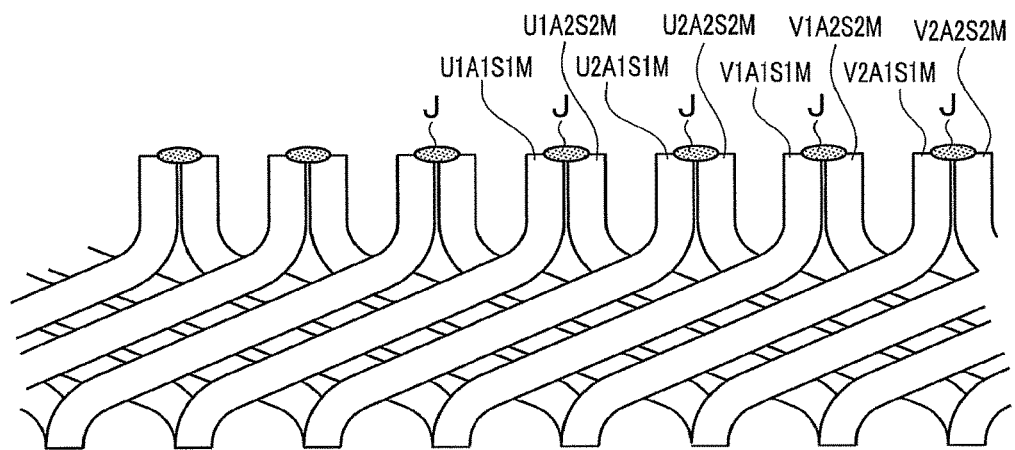
FIG. 14 is a side view of FIG. 13.
Figure 15:
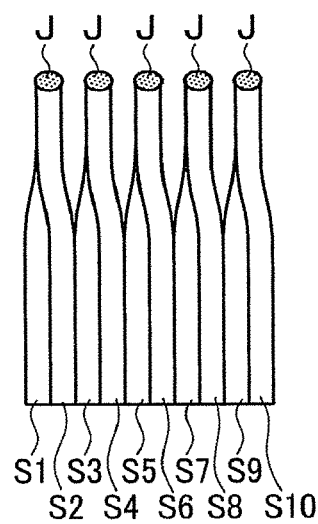
FIG. 15 is a side view of segment coils in one part in FIG. 13.

FIGS. 13 to 15 show the contact distal end parts M joined to each other by TIG welding. FIG. 13 corresponds to FIG. 1, FIG. 14 corresponds to FIG. 2, and FIG. 15 corresponds to FIG. 3. In FIG. 14, for easy viewing, the slots of FIG. 13 are illustrated in planar form and at equal intervals.

As shown in FIG. 13, the distal end part U1A1S1M and the distal end part U1A2S2M located in nearly contact relation are joined by TIG welding using a TIG terminal put at a midpoint between those distal end parts, thereby forming a bead J. Similarly, the distal end part U1A1S3M and the distal end part U1A2S4M located in nearly contact relation are joined by TIG welding using the TIG terminal put at a midpoint between those distal end parts, thereby forming a bead J. Similarly, the distal end part U1A1S5M and the distal end part U1A2S6M located in nearly contact relation are joined by TIG welding using the TIG terminal put at a midpoint between those distal end parts, thereby forming a bead J.

At an adjacent location in the circumferential direction on the outermost circumference, the distal end part U2A1S1M and the distal end part U2A2S2M located in nearly contact relation are joined by TIG welding using the TIG terminal put at a midpoint between those distal end parts, thereby forming a bead J. Similarly, at a further adjacent location in the circumferential direction, the distal end part V1A1S1M and the distal end part V1A2S2M located in nearly contact relation are joined by TIG welding using the TIG terminal put at a midpoint between those distal end parts, thereby forming a bead J. At a still further adjacent location in the circumferential direction, similarly, the distal end part V2A1S1M and the distal end part V2A2S2M located in nearly contact relation are joined by TIG welding using the TIG terminal put at a midpoint between those distal end parts, thereby forming a bead J.

Connecting the segment coils of the whole stator 1 is explained below. As shown in FIG. 18, the distal end part U1A2S1M of the in-slot wire portion U1A2S1 located on the outermost circumference of the U-phase first coil U1 inserted in the slot TS28 is connected to the distal end part U1B1S2M of the in-slot wire portion U1B1S2 inserted in the slot TS34. The in-slot wire portion U1A2S1 is integral with the in-slot wire portion U1A1S1 via the connecting portion 12. The distal end part U1A1S1M of the in-slot wire portion U1A1S1 is connected to the distal end part U1A2S2M of the in-slot wire portion U1A2S2. The in-slot wire portion U1A2S2 is integral with the in-slot wire portion U1A1S2 via the connecting portion 12.

The distal end part U1A1S3M of the in-slot wire portion U1A1S3 is connected to the distal end part U1A2S4M of the in-slot wire portion U1A2S4. The in-slot wire portion U1A2S4 is integral with the in-slot wire portion U1A1S4 via the connecting portion 12. The distal end part U1A1S5M of the in-slot wire portion U1A1S5 is connected to the distal end part U1A2S6M of the in-slot wire portion U1A2S6. The in-slot wire portion U1A2S6 is integral with the in-slot wire portion U1A1S6 via the connecting portion 12. The distal end part U1A1S7M of the in-slot wire portion U1A1S7 is connected to the distal end part U1A2S8M of the in-slot wire portion U1A2S8. The in-slot wire portion U1A2S8 is integral with the in-slot wire portion U1A1S8 via the connecting portion 12.

The distal end part U1A1S9M of the in-slot wire portion U1A1S9 is connected to the distal end part U1A2S10M of the in-slot wire portion U1A2S10. The in-slot wire portion U1A2S10 is integral with the in-slot wire portion U1A1S10 via the connecting portion 12. The distal end part U1A1S10M of the in-slot wire portion U1A1S10 is connected to the distal end part U1D2S9M of the in-slot wire portion U1D2S9 inserted in the slot TS16.

Accordingly, the coil constituted of the segment coil group U1A is configured so that the distal end part U1A2S1M of the in-slot wire portion U1A2S1 on the outermost circumference in the slot TS28 is connected to the distal end part U1B1S1M of the in-slot wire portion U1B1S1 inserted in the slot TS34, and, after winding through the coil, the in-slot wire portion U1A1S10 on the innermost circumference is connected to the in-slot wire portion U1D2S9 inserted in the slot TS16.

The segment coil groups U1A, U1B, U1C, and U1D of the U-phase first coil are sequentially connected, and then, the segment coil groups U2A, U2B, U2C, and U2D of the U-phase second coil are sequentially connected. The segment coil group U1A of the U-phase first coil is connected to a power terminal UCC. The segment coil group U2D of the U-phase second coil is connected to a neutral wire not illustrated. Similarly, the segment coil groups V1A, V1B, V1C, and V1D of the V-phase first coil are sequentially connected, and then the segment coil groups V2A, V2B, V2C, and V2D of the V-phase second coil are sequentially connected. The segment coil group V1A of the V-phase first coil is connected to a power terminal VCC. The segment coil group V2D of the V-phase second coil is connected to a neutral line not illustrated. Similarly, the segment coil groups W1A, W1B, W1C, and W1D of the W-phase first coil are sequentially connected, and then the segment coil groups W2A, W2B, W2C, and W2D of the W-phase second coil are sequentially connected. The segment coil group W1A of the W-phase first coil is connected to a power terminal WCC. The segment coil group W2D of the W-phase second coil is connected to a neutral line not illustrated.

As explained in detail above, the stator and the method for manufacturing the stator in the embodiment can provide the following advantageous effects.

(1) In the stator in which the plurality of segment coils 9 each consisting of a pair of the straight portions A1 and A2 connected with the connecting portion 12 in a U-like shape are set in the slots S of the stator core 11, each pair of the straight portions A1 and A2 having the distal end parts M protruding on the opposite side to the connecting portions 12, and the distal end parts M located in odd-numbered positions in the radial direction are twisted in one direction (e.g., clockwise direction), while the distal end parts M located in even-numbered positions are twisted in the opposite direction (e.g., counterclockwise direction) to the one direction, so that the distal end parts M twisted in the one direction and the distal end parts M twisted in the opposite direction are joined to each other by welding. The distal end parts M twisted in the one direction are shaped outward in the radial direction, while the distal end parts M twisted in the opposite direction are shaped inward in the radial direction. Thereby, the distal end parts M twisted in the one direction and the distal end parts M twisted in the opposite direction are welded to each other on the same circumference. Conventional distal end parts M are arranged with large gaps in the circumferential direction but with little gaps in the radial direction. In contrast, the gaps in the circumferential direction are reduced and the gaps in the radial direction are generated. It is therefore possible to generate appropriate gaps or clearance all around the pair of distal end parts M to be welded (e.g., U1A1S3M and U2A2S4M). Even if large beads J are formed, accordingly, the beads J are less likely to contact with the adjacent distal end parts. Consequently, there is no need to precisely control the size of the beads J, thus leading to cost reduction of a control unit.

(2) In the stator described in (1), each distal end part M twisted in the one direction is shaped toward the outer circumference in the radial direction by a length or distance corresponding to half the thickness of the straight portion in the radial direction, and each distal end part M twisted in the opposite direction is shaped toward the inner circumference in the radial direction by a length corresponding to half the thickness of the straight portion in the radial direction. This makes it possible to form almost uniform gaps all around each pair of distal end parts M to be welded. Even if large beads J are formed, accordingly, the beads J are less likely to contact with the adjacent distal end parts M. Consequently, there is no need to precisely control the size of the beads J, thus leading to cost reduction of the control unit.

(3) The stator manufacturing method includes: the inserting step of inserting the segment coils 9, each consisting of a pair of the straight portions A1 and A2 connected with the connecting portion 12 in a U-like shape, in the slots S of the stator core 11; the twisting step of rotating the twisting ring E while the distal end parts M of the pair of straight portions A1 and A2 protruding on the opposite side to the connecting portion 12 are engaged with the ring grooves EN of the twisting ring E to twist and shape the distal end parts located in odd-numbered positions in the radial direction in the one direction (e.g., clockwise direction) and the distal end parts located in even-numbered positions in the opposite direction (e.g., counterclockwise direction) to the one direction; and a welding step of welding the distal end parts M twisted in the one direction and the distal end parts M twisted in the opposite direction. In this method, the twisting step includes twisting and shaping the distal end parts M twisted in the one direction and the distal end parts M twisted in the opposite direction so that these distal end parts are placed in adjacent positions in the circumferential direction. The method further includes the radial-direction shaping step, after the twisting step, of shaping the distal end parts M twisted in the one direction, toward the outer circumference in the radial direction, and shaping the distal end parts M twisted in the opposite direction, toward the inner circumference in the radial direction. Conventional distal end parts M are arranged with large gaps in the circumferential direction but with little gaps in the radial direction. In contrast, the gaps in the circumferential direction are reduced and the gaps in the radial direction are generated. It is therefore possible to generate appropriate gaps or clearance all around the pair of distal end parts M to be welded (e.g., U1A1S3M and U2A2S4M). Even if large beads J are formed, accordingly, the beads J are less likely to contact with the adjacent distal end parts. Consequently, there is no need to precisely control the size of the beads J, thus leading to cost reduction of a control unit.

(4) In the stator manufacturing method described in (3), in the radial-direction shaping step, the distal end parts twisted in the one direction are shaped toward the outer circumference in the radial direction by the length corresponding to half the thickness of the straight portion in the radial direction, and the distal end parts twisted in the opposite direction are shaped toward the inner circumference in the radial direction by the length corresponding to half the thickness of the straight portion in the radial direction. This makes it possible to form almost uniform gaps all around each pair of distal end parts M to be welded. Even if large beads J are formed, accordingly, the beads J are less likely to contact with the adjacent distal end parts M. Consequently, there is no need to precisely control the size of the beads J, thus leading to cost reduction of the control unit.

The embodiment is explained in detail as above, but the present invention is not limited to the above embodiment. The present invention may be embodied in other specific forms without departing from the essential characteristics thereof.

For instance, the above embodiment shows the shaping inward or outward by a length corresponding to half the thickness of a wire. As long as the gaps in the radial direction are ensured, the shaping by a smaller length may be adopted. Furthermore, the above embodiment uses TIG welding to join terminals. Any other welding method may also be adopted. Although the above embodiment describes the stator having the concentrically winding coil, the invention is applicable to a coil having a wave winding coil.

INDUSTRIAL APPLICABILITY

The present invention relates to the stator which is a motor component to be used in hybrid vehicles, and the stator manufacturing method.

REFERENCE SIGNS LIST

1 Stator
9 Segment coil
11 Stator core
12 Connecting portion
A1 One-side straight portion of segment coil
A2 Other-side straight portion of segment coil
U1 U-phase first coil
U2 U-phase second coil
V1 V-phase first coil
V2 V-phase second coil
W1 W-phase first coil
W2 W-phase second coil
A First segment coil group
B Second segment coil group
C Third segment coil group
D Fourth segment coil group
E Twisting ring
EN Ring groove
F Inner circumferential direction jig
G Outer circumferential direction jig
J Beads
M Distal end portion
S In-slot wire portion
TS Slot

The invention claimed is:

1. A method for manufacturing a stator operatively associated with an inner circumferential jig and an outer circumferential jig comprising sequentially ordered steps of:
   an inserting step of inserting segment coils, each constituting of a pair of straight portions connected with a connecting portion in a U-like shape, in slots of a stator core;
   a twisting step of rotating a twisting ring while distal end parts of the pairs of straight portions protruding on an opposite side to the connecting portions are engaged with ring grooves of the twisting ring to twist and shape in one direction the distal end parts located in odd-numbered positions from an outer circumferential side or an inner circumferential side in a radial direction and twist and shape the distal end parts located in even-numbered positions in an opposite direction to the one direction; and
   a welding step of welding the distal end parts twisted in the one direction and the distal end parts twisted in the opposite direction,
   wherein the twisting step includes twisting and shaping the distal end parts twisted in the one direction and the distal end parts twisted in the opposite direction so that the distal end parts are placed in adjacent positions in a circumferential direction,
   the method further comprises a radial-direction shaping step, after the twisting step, of shaping the distal end parts twisted in the one direction toward an outer circumference in the radial direction and shaping the distal end parts twisted in the opposite direction toward an inner circumference in the radial direction, and
   the radial-direction shaping step includes plastically deforming the distal end part of a first one of the coils, located on an outermost circumference, and the distal end part of a third one of the coils, located third from the outermost circumference, toward the inner circumference in the radial direction by use of the inner circumferential direction jig, and plastically deforming the distal end part of a second one of the coils, located second from the outermost circumference, and the distal end part of a fourth one of the coils, located fourth from the outermost circumference, toward the outer circumference in the radial direction by use of the outer circumferential direction jig.

2. The method for manufacturing a stator according to claim 1,
   wherein the radial-direction shaping step further comprises:
      shaping the distal end parts twisted in the one direction toward the outer circumference in the radial direction by a length corresponding to half a thickness of the straight portion in the radial direction; and
      shaping the distal end parts twisted in the opposite direction toward the inner circumference in the radial direction by a length corresponding to half a thickness of the straight portion in the radial direction, and
   wherein after the radial-direction shaping step, the distal end part of the first coil located on an outermost circumference and the distal end part of the second coil located second from the outermost circumference are located, in the radial direction, at a halfway position between a first position corresponding to an in-slot position of the first coil and a second position corresponding to an in-slot position of the second coil, and after the radial-direction shaping step, the distal end part of the third coil located third from the outermost circumference and the distal end part of the fourth coil located fourth from the outermost circumference are located, in the radial direction, at a halfway position between a third position corresponding to an in-slot position of the third coil and a fourth position corresponding to an in-slot position of the fourth coil.

3. The method for manufacturing a stator according to claim 1, wherein the distal end part twisted in the one direction and the distal end part twisted in the opposite direction are located so that end faces of the distal end parts face at the same position in a circumferential direction are placed in contact with each other.

4. The method for manufacturing a stator according to claim 2, wherein the distal end part twisted in the one direction and the distal end part twisted in the opposite direction are located so that end faces of the distal end parts face at the same position in a circumferential direction are placed in contact with each other.

* * * * *